(12) United States Patent
Fujii

(10) Patent No.: US 11,221,811 B2
(45) Date of Patent: Jan. 11, 2022

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventor: Masaru Fujii, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 197 days.

(21) Appl. No.: 16/442,552

(22) Filed: Jun. 17, 2019

(65) Prior Publication Data

US 2019/0391772 A1  Dec. 26, 2019

(30) Foreign Application Priority Data

Jun. 26, 2018  (JP) .............................. JP2018-121128

(51) Int. Cl.
*G06F 3/12* (2006.01)
(52) U.S. Cl.
CPC .......... *G06F 3/1243* (2013.01); *G06F 3/1204* (2013.01); *G06F 3/1205* (2013.01); *G06F 3/1211* (2013.01); *G06F 3/1238* (2013.01)

(58) Field of Classification Search
None
See application file for complete search history.

(56) References Cited

U.S. PATENT DOCUMENTS

| | | | | |
|---|---|---|---|---|
| 2012/0258696 | A1* | 10/2012 | Nam | H04W 4/02 455/414.2 |
| 2017/0109270 | A1* | 4/2017 | Ekambaram | G06Q 30/0645 |
| 2018/0024787 | A1* | 1/2018 | Sakawaki | G06F 3/1287 358/1.15 |
| 2020/0099810 | A1* | 3/2020 | Inomata | H04N 1/00514 |

FOREIGN PATENT DOCUMENTS

JP  5954104  7/2016

* cited by examiner

*Primary Examiner* — Dung D Tran
(74) *Attorney, Agent, or Firm* — JCIPRNET

(57) ABSTRACT

An information processing apparatus includes an acquiring unit that acquires operation information indicating an operation of a user, a first specifying unit that specifies an application corresponding to the operation information among applications not used by the user, a second specifying unit that specifies a terminal through which the application specified by the first specifying unit is capable of being used, and a transmitting unit that transmits application information indicating the application and terminal information indicating the terminal, to a terminal operated by the user.

20 Claims, 8 Drawing Sheets

FIG. 3

| OPERATION NUMBER | TIMING | ACCOMPANYING CONDITION 1 | ACCOMPANYING CONDITION 2 |
|---|---|---|---|
| 1 | AT TIME OF ACTIVATING APPLICATION | ALL APPLICATIONS OF IMAGE TRANSMITTING SYSTEM | - |
| 2 | AT TIME OF ACTIVATING APPLICATION | DEFAULT PRINT | - |
| 3 | AT TIME OF ACTIVATING APPLICATION | DEFAULT SCAN | - |
| ... | ... | ... | ... |
| 101 | AT TIME OF OPERATING APPLICATION | ALL APPLICATIONS OF IMAGE TRANSMITTING SYSTEM | - |
| 102 | AT TIME OF OPERATING APPLICATION | DEFAULT SCAN | - |
| 103 | AT TIME OF OPERATING APPLICATION | DURING OPERATION IN GENERAL USER AUTHORITY | ALL APPLICATIONS OF IMAGE TRANSMITTING SYSTEM |
| ... | ... | ... | ... |
| 201 | AT TIME OF PASSING THROUGH DESIGNATED SCREEN | TRANSITION TO SCREEN (A) | - |
| 202 | AT TIME OF PASSING THROUGH DESIGNATED SCREEN | DURING OPERATION IN ADMINISTRATOR AUTHORITY | TRANSITION TO SCREEN FOR EDITING ADDRESS BOOK |
| 203 | AT TIME OF PASSING THROUGH DESIGNATED SCREEN | DURING OPERATION IN GENERAL USER AUTHORITY | TRANSITION TO SCREEN (I) |
| ... | ... | ... | ... |

| RECOMMENDATION NUMBER | RECOMMENDED APPLICATION NAME | TERMINAL TYPE NAME | OPERATION NUMBER |
|---|---|---|---|
| 1 | A B C PRINT | T01, T02, ⋯ | No.2, No.103, No.104 |
| 2 | CLOUD SCAN A | T11, T12, ⋯ | No.101 |
| 3 | X Y Z SCAN | T01, T11, T12, T21, ⋯ | No.3, No.202 |
| ⋯ | ⋯ | ⋯ | ⋯ |

| MANAGEMENT NUMBER | AVAILABLE APPLICATION NAME | IP ADDRESS | LOCATION INFORMATION | OPERATION STATE |
|---|---|---|---|---|
| 1 | A B C PRINT<br>CLOUD SCAN A | 172.27.1.51 | X BUILDING 17F SOUTH | POWER SUPPLY OFF |
| 2 | X Y Z SCAN<br>M N L COPY | 172.27.1.52 | X BUILDING 18F SOUTH | IN OPERATION |
| 3 | CLOUD SCAN B<br>X Y Z SCAN | 172.27.5.88 | X BUILDING 18F NORTH | DURING MAINTENANCE |
| 4 | X Y Z SCAN | 172.27.11.4 | X BUILDING 4F CENTER | IN OPERATION |
| ⋯ | ⋯ | ⋯ | ⋯ | ⋯ |

123

| TRANSMISSION TIME | TERMINAL NAME | RECOMMENDED APPLICATION NAME | RESPONSE | |
|---|---|---|---|---|
| ... | ... | ... | YES | 124 |
| ... | ... | ... | NO | |
| ... | ... | ... | DENIED | |

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-121128 filed Jun. 26, 2018.

BACKGROUND

(i) Technical Field

The present invention relates to an information processing apparatus, an information processing system, and a non-transitory computer readable medium storing a program.

(ii) Related Art

For example, a so-called "stationary type" apparatus, which provides a service to a user who is at an installed location of the apparatus, includes, for example, an image forming apparatus such as a copy machine or a printer, an image transmitting apparatus, an image reading apparatus such as a facsimile and a scanner, and the like. In recent years, there are stores that install a plurality of stationary type terminals for a number of unspecified users and provide services by those terminals.

JP5954104B discloses a print management apparatus that may report a state of a device that is highly likely to be used even though a print instruction is given in a state in which a device for outputting is not determined, upon a print command.

SUMMARY

By the way, in consideration of the ease of upgrading and customization, instead of incorporating a function directly into a UI, general purpose terminals such as a mobile phone or a PC have taken a way of adding a function by introducing an application program (hereinafter, referred to as an "application") into an Operating System (OS) that operates the UI. A terminal that uses an application performs recommendation processing for recommending an application that has not yet been introduced and promoting a user to introduce the application.

For example, since the stationary terminal provided at a convenience store or the like is targeted to a number of unspecified users, it is impossible for the users to introduce favorite applications, respectively. In this case, for allowing a user to experience an application, it is necessary to guide the user to an installation location of another terminal to which the application has already been introduced.

Aspects of non-limiting exemplary embodiments of the present disclosure relate to an information processing apparatus, an information processing system, and a non-transitory computer readable medium storing a program for recommending an application for providing a function to a user and guiding the user to a terminal through which it is possible to experience the application, in a case where the user of the terminal needs the function.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: an acquiring unit that acquires operation information indicating an operation of a user, a first specifying unit that specifies an application corresponding to the operation information among applications not used by the user, a second specifying unit that specifies a terminal through which the application specified by the first specifying unit is capable of being used, and a transmitting unit that transmits application information indicating the application and terminal information indicating the terminal, to a terminal operated by the user.

BRIEF DESCRIPTION OF THE DRAWINGS

Exemplary embodiment(s) of the present invention will be described in detail based on the following figures, wherein:

FIG. 3 is a diagram showing an example of a condition DB 121 stored in a storage unit 12;

FIG. 4 is a diagram showing an example of an application DB 122 stored in the storage unit 12;

FIG. 5 is a diagram showing an example of a management DB 123 stored in the storage unit 12;

DETAILED DESCRIPTION

Hereinafter, an exemplary embodiment of the present invention will be described in detail with reference to the accompanying drawings.

Exemplary Embodiment

Overall Configuration of Information Processing System

Figure 1:
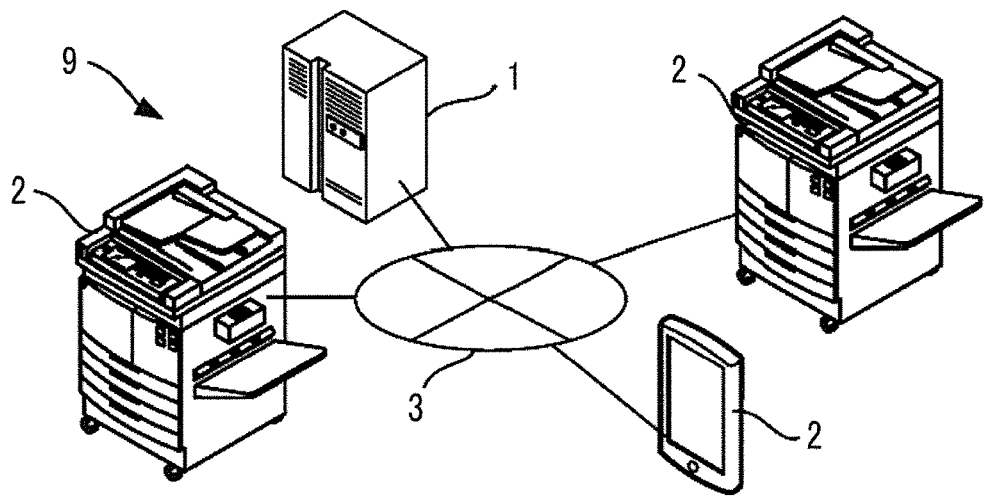
FIG. 1 is a diagram showing a configuration of an information processing system 9 according to an exemplary embodiment.

FIG. 1 is a diagram showing a configuration of an information processing system 9 according to the exemplary embodiment. The information processing system 9 includes an information processing apparatus 1 and a plurality of terminals 2, and further includes a communication channel 3 through which the information processing apparatus 1 and the plurality of terminals 2 are communicably connected. Note that, the information processing system 9 may include a plurality of information processing apparatuses 1.

The information processing apparatus 1 is a server apparatus that manages a plurality of terminals 2 through the communication channel 3. The terminal 2 is a stationary terminal used by the user. Note that, the terminal 2 may include not only the stationary terminal but also a portable terminal for operating the stationary terminal.

The communication channel 3 may be, for example, a Local Area Network (LAN), a Wide Area Network (WAN), the Internet, or a combination thereof. The communication channel 3 may include Public Switched Telephone Networks (PSTN), Integrated Services Digital Network (ISDN), and the like.

Configuration of Information Processing Apparatus

Figure 2:
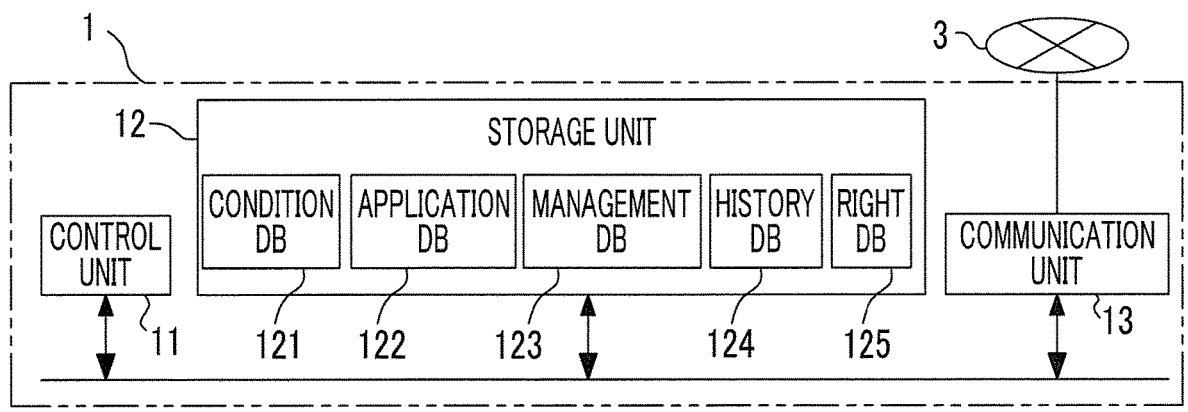
FIG. 2 is a diagram showing a configuration of an information processing apparatus 1.

FIG. 2 is a diagram showing the configuration of the information processing apparatus 1. As shown in FIG. 2, the information processing apparatus 1 includes a control unit 11, a storage unit 12, and a communication unit 13.

The control unit 11 includes a Central Processing Unit (CPU), a Read Only Memory (ROM), and a Random Access Memory (RAM), and the CPU controls each unit of the information processing apparatus 1 by reading out and executing a computer program (hereinafter, simply referred to as a program) stored in the ROM and the storage unit 12.

The communication unit 13 is a communication circuit that is connected to the communication channel 3 by wire or wireless. The information processing apparatus 1 exchanges information with the terminal 2 connected to the communication channel 3 by the communication unit 13.

The storage unit 12 is storage means such as a hard disk drive, and stores various programs, data, and the like to be read into the CPU of the control unit 11. The storage unit 12 stores the condition DB 121, the application DB 122, the management DB 123, the history DB 124, and the right DB 125.

Configuration of Condition DB

FIG. 3 is a diagram showing an example of the condition DB 121 stored in the storage unit 12. The condition DB 121 shown in FIG. 3 is a database that stores conditions used for classifying operations on the terminal 2 of the user.

In the condition DB 121, a timing of an operation of a user, a condition (accompanying condition) accompanying the operation, and a number (referred to as an operation number) into which the operation is classified are described in association with one another. An operation classified into an operation number described in the condition DB 121 is performed at the timing associated with the operation number and satisfies the accompanying condition associated with the operation number.

For example, an operation classified into an operation number "1" is an operation performed at a timing of activating the application (at a time of activating the application), and the activated application is all the applications of the image transmitting system.

Another operation classified into another operation number "3" is an operation at the time of activating the application of a name (application name) referred to as a "default scan". In a case where operation information indicating the operation is acquired from the terminal 2, referring to the condition DB 121, the control unit 11 specifies the operation number to which the operation is classified. That is, in the case where the operation information is acquired, the control unit 11 classifies the operation.

In the condition DB 121 shown in FIG. 3, there are two columns of accompanying conditions, but there may be one accompanying condition, or three or more accompanying conditions. In the case where a plurality of accompanying conditions are provided, the operation may be classified based on whether or not a logical AND of the plurality of those accompanying conditions is satisfied, or whether or not a logical OR of the plurality of those accompanying conditions is satisfied. In the condition DB 121, in a case where three or more columns of accompanying conditions are provided, the operation may be classified based on whether or not a combination condition of the logical OR and the logical AND of those accompanying conditions are satisfied. A "SCREEN (A)" or another "SCREEN (I)" in the condition DB 121 shown in FIG. 3 is an example of a type of a screen, and "passing through a designation screen" means a timing of passing through a designated screen (designation screen) in a case of transitioning to another screen.

Configuration of Application DB

FIG. 4 is a diagram showing an example of the application DB 122 stored in the storage unit 12. The application DB 122 shown in FIG. 4 is a database that stores information of an application (recommended application) to be recommended according to an operation of the terminal 2.

When the information processing apparatus 1 acquires the operation information from the terminal 2, the application DB 122 stores a name (recommended application name) of the recommended application and the operation number of the operation indicated by the acquired operation information, in association with each other. This operation number is an operation number when the operation is classified on the condition DB 121 shown in FIG. 3.

In this application DB 122, the recommended application name may be stored in association with a name (terminal type name) of a type of a terminal that may introduce the recommended application.

Here, for example, it is desirable that the recommended application to be recommended according to the operation of the terminal 2 is an application of which the operation is improved by using the application. Here, the "improvement of an operation" means that an efficiency of the operation, a quality of the results of the operation, and the like have been improved for the user, and specifically, is reduction of an effort of the user, processing steps, processing time, or the like with respect to transition to a screen or operation on a virtual object such as a button, and so on. The improvement of the operation may be determined comprehensively according to a predetermined rule for a plurality of characteristics.

Note that, the application DB 122 may be described such that a new application having the function of the application currently used is recommended as the recommended application even though it is unknown whether the operation will be improved.

By referring to this application DB 122, the information processing apparatus 1 specifies the recommended application associated with the operation number of the operation indicated by the acquired operation information.

In the application DB 122, in a case where, for each set of a recommendation number and an operation number, an operation corresponding to the operation number is performed using the recommended application having the recommendation number, an amount indicating a degree of improvement in the operation (referred to as an improvement amount) may be stored in association with one another. In this case, referring to the application DB 122, the information processing apparatus 1 specifies the improvement amount described above.

In the application DB 122, various parameters used for calculating the improvement amount may be stored in association with the set of the recommendation number and the operation number. In this case, referring to the application DB 122, the information processing apparatus 1 calculates the improvement amount described above.

Here, such an improvement amount is, for example, the time required for the operation, the number of steps, or the like, which has been decreased by using the recommended application. For example, in a case where the terminal 2 that uses the recommended application is a terminal that performs processing on an image, such as the image forming apparatus, the image reading apparatus, the image display apparatus, and the image transmitting apparatus, the improvement amount means an amount that has improved by using the recommended application on the terminal 2, with respect to image quality or quality such as the resolution of the processed image, pixel density, the number of colors, gradation expression ability and the like.

Configuration of Management DB

FIG. 5 is a diagram showing an example of the management DB 123 stored in the storage unit 12. The management DB 123 shown in FIG. 5 is a database that manages an operation state of a plurality of terminals 2. The management DB 123 stores a management number of the terminal 2, a name (available application name) of an application (available application) available on the terminal 2, identification information (herein, an IP address as an example) for identifying the terminal 2 on the communication channel 3, and position information indicating a location at which the terminal 2 is installed, in association with one another.

The management DB 123 may store a name (terminal name) of the terminal 2 or the terminal type name in association with the management number of the terminal 2. The management DB 123 may store a price for use of the terminal 2 in association with the management number of the terminal 2.

In other words, using the management DB 123, the information processing apparatus 1 manages a plurality of terminals 2 by assigning a management number to each of these terminals 2 and searches the management DB 123 with the management number, thereby specifying available applications for each terminal 2, identification information of the terminal 2 on the communication channel 3, and position information indicating a position at which the terminal 2 is disposed. The information processing apparatus 1 acquires information of the operation state from each terminal 2 through the communication channel 3, and updates a column of the operation state of the management DB 123 based on the acquired information.

When specifying the recommended application, referring to the management DB 123, the information processing apparatus 1 specifies the terminal 2 through which the recommended application is capable of being used, and the operation state of the terminal 2.

Configuration of History DB

Figures 6, 7:
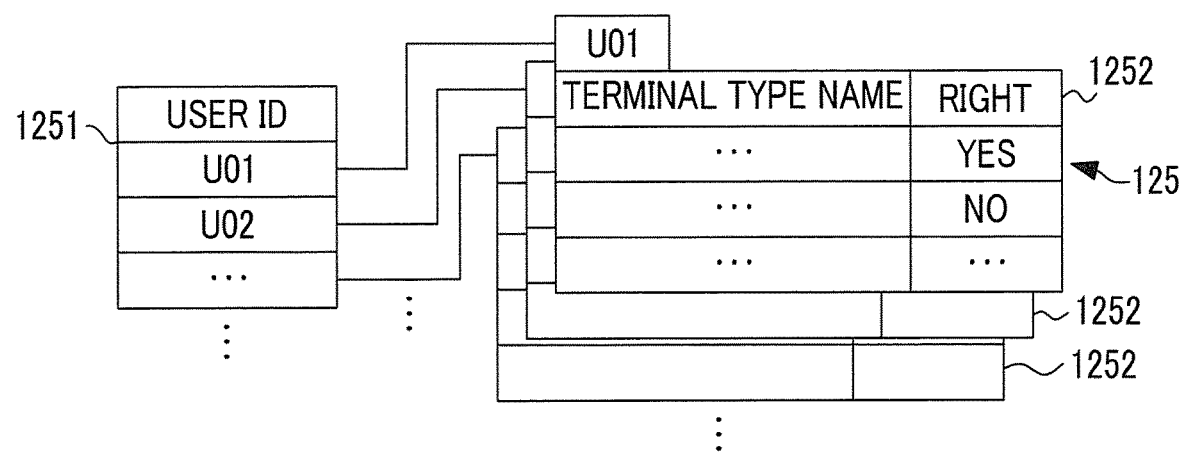
FIG. 6 is a diagram showing an example of a history DB 124 stored in the storage unit 12.
FIG. 7 is a diagram showing an example of a right DB 125 stored in the storage unit 12.

FIG. 6 is a diagram showing an example of the history DB 124 stored in the storage unit 12. The history DB 124 shown in FIG. 6 is a database that stores a history of transmitting the information of the recommended application to the terminal 2 which has acquired the operation information. The history DB 124 stores the recommended application name, time (transmission time) at which the information of the recommended application has transmitted, and the terminal name of the terminal 2 that has transmitted the information, in association with one another. The history DB 124 may store presence or absence of a user response with respect to the transmission, contents of the response, and the like.

Configuration of Right DB

FIG. 7 is a diagram showing an example of the right DB 125 stored in the storage unit 12. The right DB 125 shown in FIG. 7 is a database that stores, for each user, presence or absence of a right of the user in each of a plurality of terminals. This right DB 125 includes a user ID list 1251 and a right list 1252.

A user ID that is identification information for identifying each of a plurality of users is described in the user ID list 1251, and the right list 1252 is stored in association with each of these user IDs. The right list 1252 stores, for each terminal type name, whether or not a user identified by the user ID may use a terminal having a type indicated by the terminal type name.

In addition to the terminal type name, the right list 1252 may store presence or absence of a right of the corresponding user for each terminal name. The right list 1252 may store, for each pair of the terminal type name or the terminal name and the application, whether the user may use the application in the terminal corresponding to the terminal type name or terminal name.

Configuration of Terminal

Figure 8:
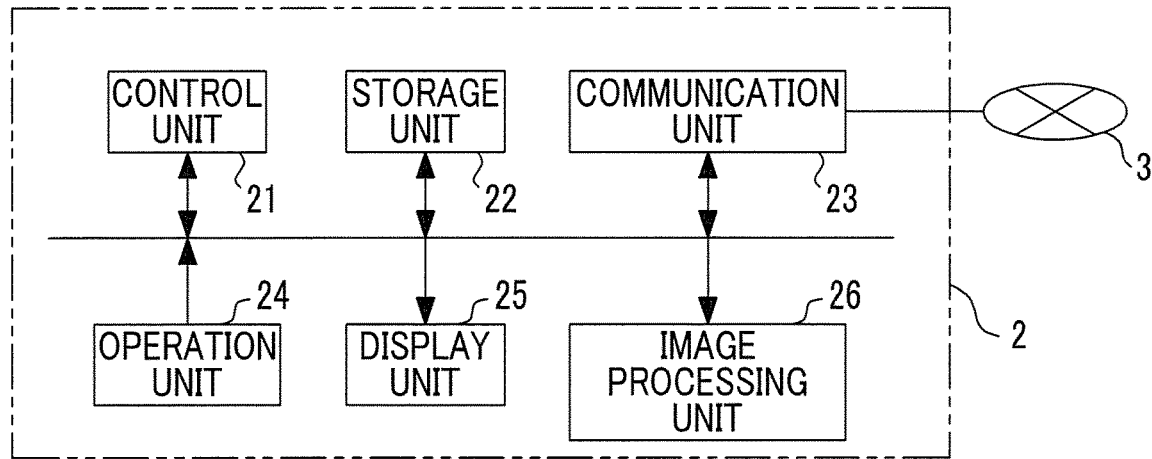
FIG. 8 is a diagram showing an example of a configuration of a terminal 2.

FIG. 8 is a diagram showing an example of the configuration of the terminal 2. The terminal 2 shown in FIG. 8 includes a control unit 21, a storage unit 22, a communication unit 23, an operation unit 24, a display unit 25, and an image processing unit 26. This terminal 2 is an image processing terminal having functions to form an image, to read an image, and to transmit an image.

Note that, for example, in the case where a terminal 2 operates another stationary terminal 2 through the communication channel 3, a near-field wireless communication, or the like, the terminal 2 may not include the image processing unit 26.

The control unit 21 includes a CPU, a ROM, and a RAM, and the CPU reads out and executes programs stored in the ROM and the storage unit 22, thereby controlling each unit of the terminal 2.

The storage unit 22 is storage means such as a solid state drive or a hard disk drive, and stores various programs, data, and the like which are read into the CPU of the control unit 21.

The communication unit 23 is a communication circuit that is connected to the communication channel 3 by wire or wireless. The terminal 2 exchanges information with the information processing apparatus 1 connected to the communication channel 3 by the communication unit 23. The communication unit 23 may have a function of near-field wireless communication.

The operation unit 24 has an operator such as an operation button, a keyboard, a touch panel, and the like for receiving various instructions, accepts an operation by a user, and transmits a signal according to contents of the operation, to the control unit 21.

The display unit 25 has a display screen such as a liquid crystal display and displays an image under the control of the control unit 21. A transparent touch panel of the operation unit 24 may be overlapped and disposed on the display screen.

Under the control of the control unit 11, the image processing unit 26 forms an image on a medium such as paper, reads an image formed on the medium, and transmits image data indicating the image.

Upon receiving an operation from the user through the operation unit 24, the terminal 2 supplies operation information indicating the operation to the information processing apparatus 1 through the communication unit 23 and the communication channel 3. The operation information includes, for example, a timing of the operation, an application name and identification information of the operated application, and contents of the operation. In a case where the terminal 2 receives, from the information processing apparatus 1, the recommended application and information of the terminal 2 through which the recommended application is capable of being used, the terminal 2 presents the information to the user on the display unit 25.

Functional Configuration of Information Processing System

Figure 9:
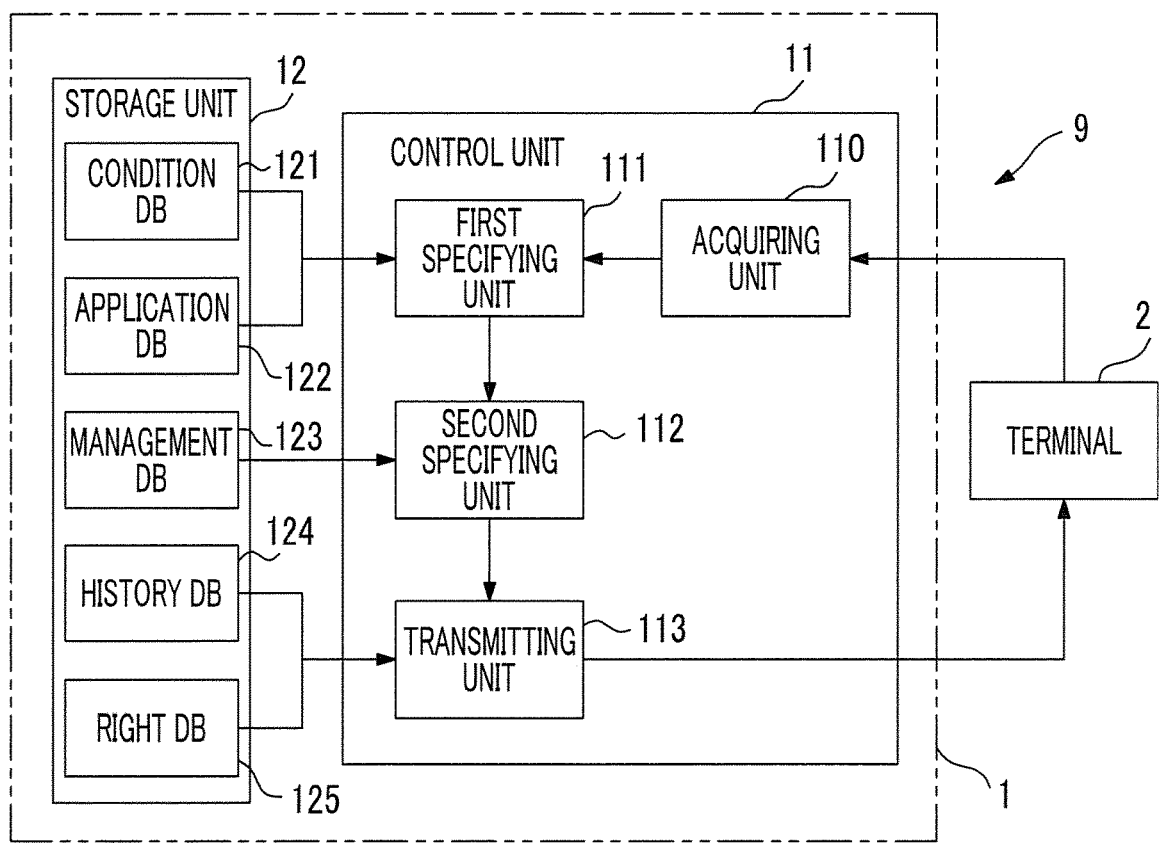
FIG. 9 is a diagram showing a functional configuration of the information processing system 9.

FIG. 9 is a diagram showing a functional configuration of the information processing system 9. In FIG. 9, each configuration of the communication unit 13 of the information processing apparatus 1, the communication channel 3, and the terminal 2 will be not described repeatedly.

The control unit 11 of the information processing apparatus 1 functions as an acquiring unit 110, a first specifying unit 111, a second specifying unit 112, and a transmitting unit 113 by reading out and executing the program stored in the storage unit 12.

In a case where each of a plurality of terminals 2 connected to the information processing apparatus 1 through the communication channel 3 receives an operation from the user, the terminal transmits operation information indicating the operation to the information processing apparatus 1. The acquiring unit 110 acquires operation information indicating the operation of the user of the terminal 2 from the terminal 2 through the communication channel 3, and transmits the operation information to the first specifying unit 111.

The first specifying unit 111 specifies an application corresponding to the operation information among the applications not used by the user. The first specifying unit 111 specifies the operation number of the operation indicated by the operation information transmitted from the acquiring unit 110, referring to the condition DB 121, and specifies the recommended application to be recommended for the operation of the operation number, referring to the application DB 122.

The second specifying unit 112 specifies a terminal through which the recommended application specified by the first specifying unit 111 is capable of being used. When the first specifying unit 111 specifies the recommended application, referring to the management DB 123, the second specifying unit 112 specifies the terminal 2 through which the recommended application is capable of being used, and the operation state of the terminal 2.

The transmitting unit 113 transmits the application information indicating the application specified by the second specifying unit 112 and the terminal information indicating the terminal 2 specified by the first specifying unit 111, to the terminal 2 operated by the user.

Note that, the first specifying unit 111 calculates, for each application, the improvement amount indicating the degree to which the operation indicated by the operation information is improved by using this application and specifies one or more applications based on the improvement amount. In this case, the transmitting unit 113 may transmit the improvement amount calculated for the application indicated by the application information to the terminal 2.

In a case where the user does not have the right to use the terminal 2 specified by the first specifying unit 111, the transmitting unit 113 may transmit data for granting this right to the user under predetermined conditions.

Referring to the history of transmission stored in the history DB 124, in a case where the application information to be transmitted has been transmitted in the past, the transmitting unit 113 may not transmit the application information. That is, the transmitting unit 113 may not transmit the already transmitted application information.

Referring to the history of transmission stored in the history DB 124, the first specifying unit 111 may exclude applications indicated by application information that has been transmitted in the past among applications corresponding to the operation information, from a specific target. In this case, also, the transmitting unit 113 does not transmit already transmitted application information.

Operation of Information Processing System

Figure 10:
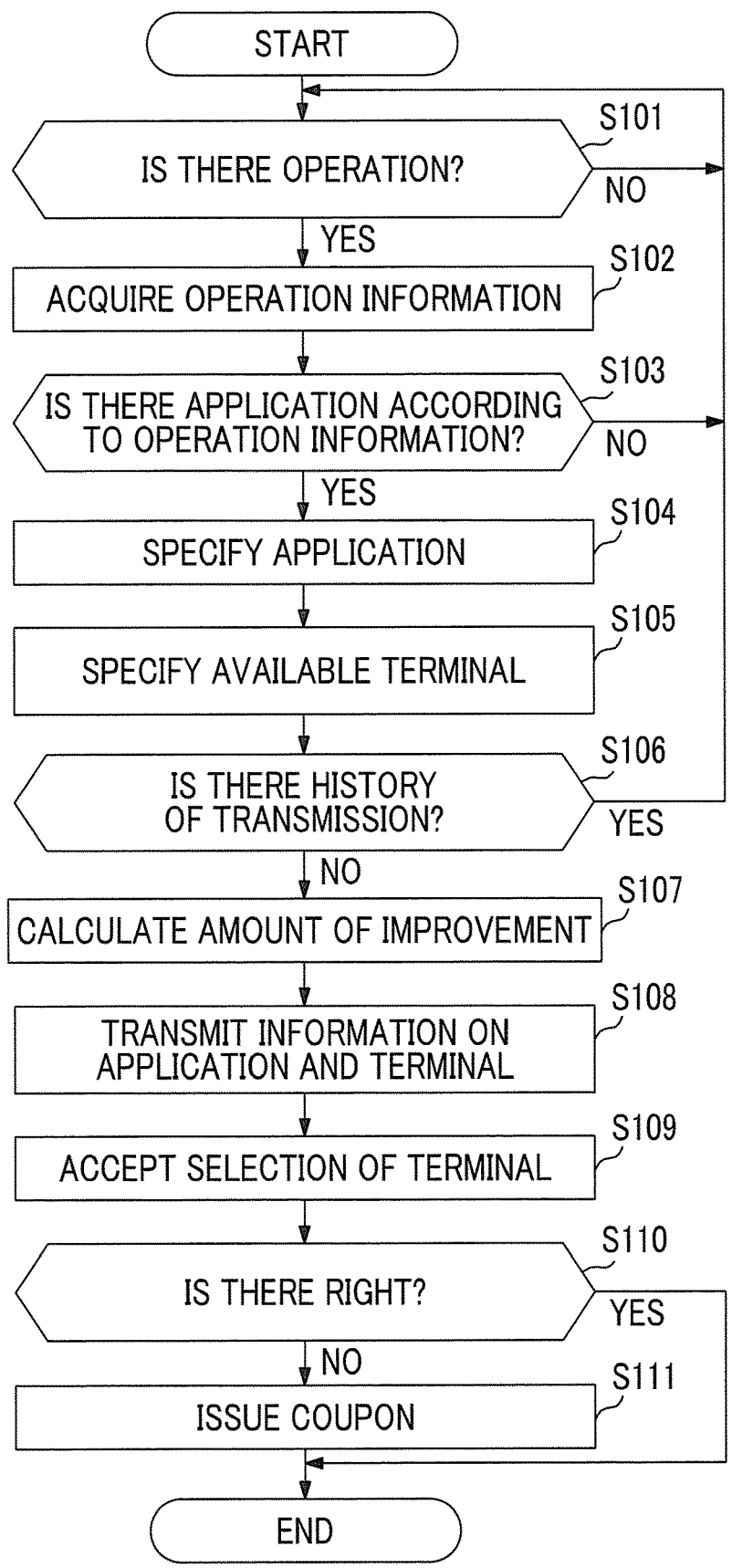
FIG. 10 is a flowchart showing a flow of operations of the information processing system 9.

FIG. 10 is a flowchart showing a flow of operations of the information processing system 9. As shown in FIG. 10, the control unit 11 of the information processing apparatus 1 determines whether or not an operation of a user on the terminal is provided (step S101) and continues to perform this determination in a case where it is determined that no operation of the user is provided (step S101, "NO"). In a case where it is determined that an operation of the user is provided (step S101, "YES"), the control unit 11 acquires operation information indicating this operation from the terminal 2 (step S102).

Once the control unit 11 acquires the operation information from the terminal 2, the control unit 11 specifies an operation number of the operation indicated by the operation information, referring to the condition DB 121, and determines whether or not an application according to the acquired operation information is provided, referring to the application DB 122 using the specified operation number (step S103).

In a case where it is determined that no application according to the acquired operation information is provided (step S103, "NO"), the control unit 11 returns processing to step S101.

In a case where it is determined that an application according to the acquired operation information is provided (step S103, "YES"), the control unit 11 reads out a recommended application name from the application DB 122 and specifies the application (step S104).

Then, by referring to the management DB 123, the control unit 11 specifies a terminal 2 through which the specified application is capable of being used (step S105).

The control unit 11 determines whether or not a history in which information of the specified application has been transmitted in the past is provided (step S106). That is, referring to the history DB 124, the control unit 11 determines whether or not the information of the application specified in step S105 is included in the information that the information processing apparatus 1 has transmitted to the terminal 2 until now.

In a case where it is determined that a history in which the information of the specified application has been transmitted in the past is provided (step S106, "YES"), the control unit 11 returns processing to step S101 without transmitting the information of the application to the terminal 2.

Through this operation, the information that has already transmitted to the user in the past is not transmitted again, so that the user of the terminal 2 is less likely to go through the persistent recommendation of the application.

In the case where it is determined that no history in which the information of the specified application has been transmitted in the past is provided (step S106, "NO"), the control unit 11 calculates an improvement amount indicating the degree to which the operation of the user is improved with use of the specified application, referring to the application DB 122 (step S107).

The control unit 11 transmits the information of the application specified in step S104 and the information of the terminal 2 specified in step S105, to the terminal 2 that has acquired the operation information in step S102 (step S108). In a case where the improvement amount is calculated in step S107, the control unit 11 may transmit this improvement amount as information of the application. Then, the control unit 11 accepts a selection of the terminal 2 by the user from the terminal 2 that has transmitted the information described above (step S109).

Figure 11:
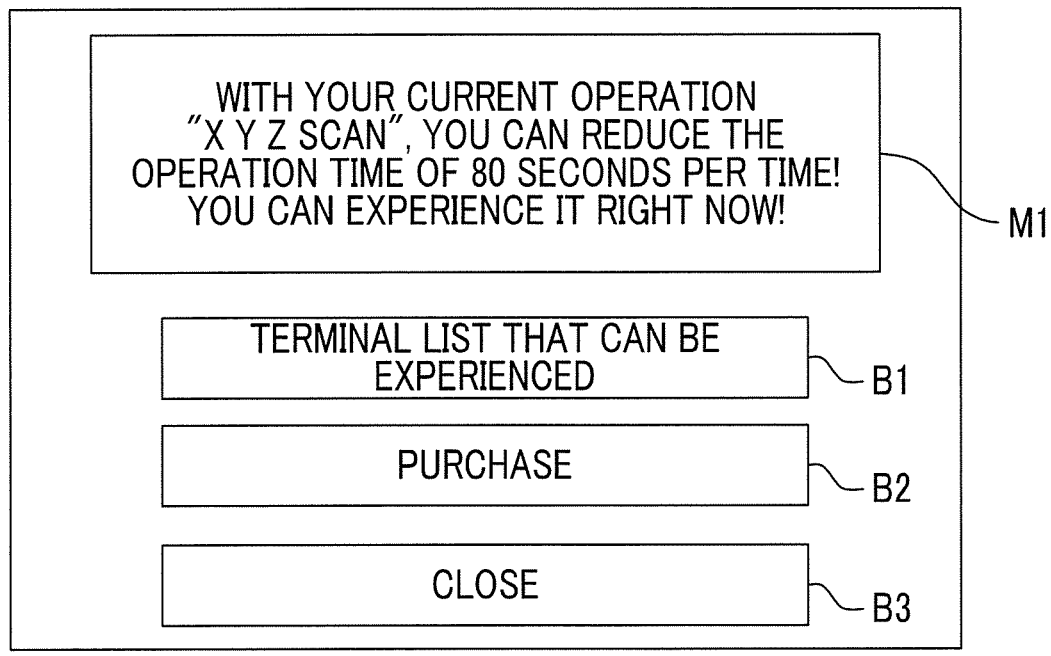
FIG. 11 is a diagram showing an example of a guide displayed by the terminal 2.

The terminal 2 that has transmitted the information of the application and the terminal 2 displays a guide to the user based on this information. FIG. 11 is a diagram showing an example of a guide displayed by the terminal 2.

For example, in a case where the user operates the terminal 2 to give an instruction of processing using a default application, the control unit 21 of the terminal 2 presents, to the user, that it takes time equal to or longer than a threshold value until the processing is activated or completed, or that the number of steps equal to or greater than a threshold value is applied, or so on.

That is, for example, the control unit 21 of the terminal 2 causes the display unit 25 to display a message M1, in which a text string of "WITH YOUR CURRENT OPERATION "XYZ SCAN", YOU CAN REDUCE OPERATION TIME OF 80 SECONDS PER TIME! YOU CAN EXPERIENCE IT RIGHT NOW!" is described, based on the information transmitted from the information processing apparatus 1. Other than this, the message M1 may be an expression of "THE OPERATION TIME OF 92 SECONDS BECOMES 12 SECONDS", or another expression of "THE OPERATION OF 10 STEPS IS SHORTENED TO AN OPERATION OF 3 STEPS".

The control unit 21 displays three buttons B1, B2, and B3 under this message M1. The button B1 is a button in which a text string of "LIST OF TERMINALS THAT YOU CAN EXPERIENCE" is described. The button B2 is a button in which a text string of "PURCHASE" is described. The button B3 is a button in which a text string of "CLOSE" is described.

For example, in a case where the user of the terminal 2 performs a click operation by pointing a pointer to any one of the buttons B1, B2, and B3 with a mouse or the like, or an operator such as a finger is brought into contact with a portion corresponding to an area where any one of these buttons B1, B2, and B3 out of the touch panel of the operation unit 24 overlapped on the display unit 25 is displayed, the corresponding button is selected.

In the case of the example shown in FIG. 11, in a case where the user selects the button B2, a purchase procedure of the recommended application "XYZ scan" is performed, and in a case where the button B3 is selected, this screen is closed, for example, the screen that has been displayed before this screen is displayed will be displayed again.

Figure 12:
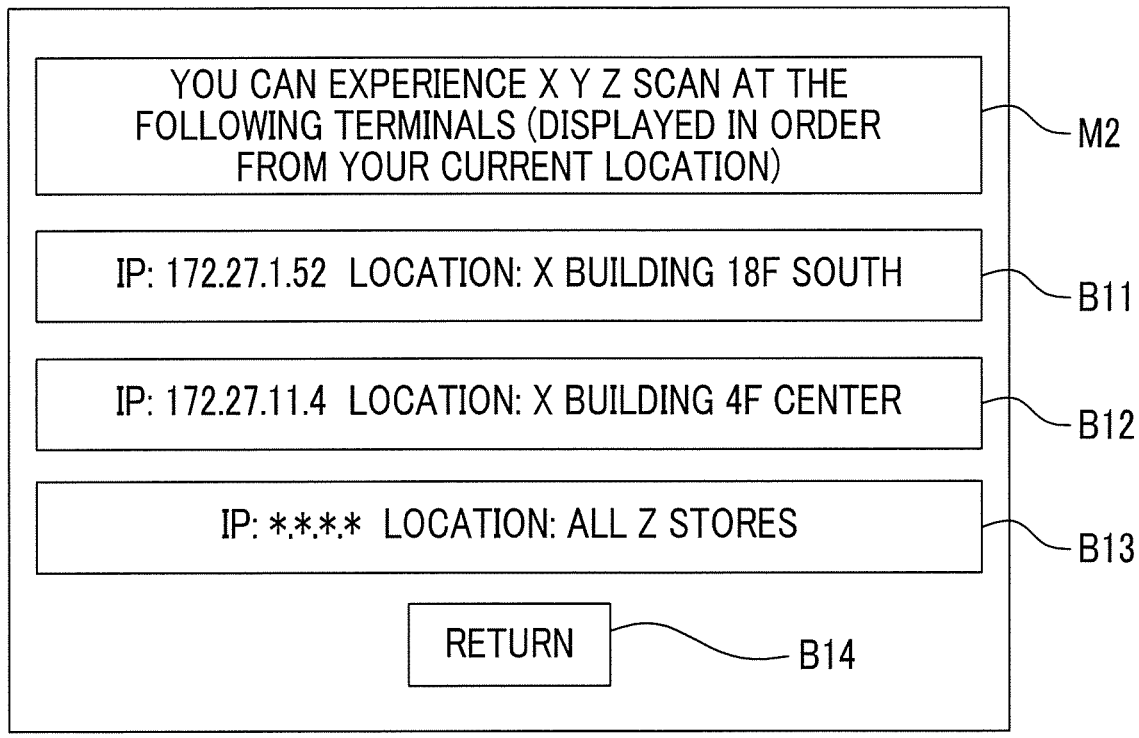
FIG. 12 is a diagram showing an example of a list of terminals in which it is possible to experience recommended applications.

In the case of the example shown in FIG. 11, in a case where the user selects the button B1, a list of terminals that may experience the recommended application is displayed. FIG. 12 is a diagram showing an example of a list of terminals that may experience the recommended application. The control unit 21 causes the display unit 25 to display a message M2 in which a text string "YOU CAN EXPERIENCE XYZ SCAN AT FOLLOWING TERMINALS (DISPLAYED IN ORDER FROM YOUR CURRENT LOCATION)" is described.

Under the message M2, the control unit 21 displays four buttons B11, B12, B13, and B14. The button B11 is a button in which a text string of "IP: 172.27.1.52 POSITION: X BUILDING 18F SOUTH" is described. The button B12 is a button in which a text string of "IP: 172.27.11.4 POSITION: X BUILDING 4F CENTER" is described. The button B13 is a button in which a text string of "IP: *.*.*.* POSITION: ALL Z STORES" is described. The button B14 is a button in which a text string of "RETURN" is described.

Note that, the buttons B11, B12, and B13 are simply areas for displaying text strings described above, and may not accept a selection operation by the user.

In a case where terminals 2 through which the recommended application indicated by the information transmitted from the information processing apparatus 1 is capable of being used include a terminal 2 for use by the user, the control unit 21 of this terminal 2 causes the display unit 25 to display a message of "YOU CAN EXPERIENCE "XYZ SCAN" ON THIS TERMINAL", for example.

In the example shown in FIG. 12, in a case where the user selects the button B14, the control unit 21 closes the screen shown in FIG. 12 and causes the display unit 25 to display the screen that has been displayed before this screen is displayed.

In a case where any one of the buttons B11, B12, and B13 is selected by the user, the information of the terminal 2 indicated by the text string described in the selected button is transmitted to the information processing apparatus 1. As described above, the information processing apparatus accepts information of the terminal 2 selected by this user from the terminal 2 operated by the user.

The information processing apparatus 1 determines whether or not the user has a right to use the terminal 2 indicated by the button selected by the user (step S110), and issues a coupon for permitting use of the terminal 2 under the predetermined conditions (step S111) in a case where the user does not have the right to use the terminal 2 (step S110, "NO").

The coupon is a data string composed of numerals, text, and the like that may not be predicted by the user, and by inputting this data string to the terminal 2 described above, the user is permitted to use the terminal 2 under predetermined conditions. In other words, the coupon described here is data for granting the right to the user under the predetermined conditions in a case where the user does not have the right.

The predetermined conditions may be, for example, an upper limit of the number of available times, a deadline, or may be a restriction on a function to be used. As the restriction of the function to be used, for example, in a case where the terminal 2 is an image forming apparatus, a restriction on a type of a toner used for forming an image, a restriction on the image forming on both sides of the medium, and the like are used.

For example, in a stationary terminal 2 for a number of unspecified users to use, since it is prohibited for each user to introduce an application, as long as the terminal 2 continues to be used, the user may not use an application, and a provider of the application may only use, for example, a moving image or the like in order to explain usefulness of the application. However, in the explanation with the moving image or the like, the user often loses motivation to use the recommended application explained above because the user may not obtain an operation feeling with an actual machine.

Through the operation in step S111 described above, the user obtains an opportunity to use the terminal 2, which is prohibited from being normally used, under the predetermined conditions in order to experience the application. Therefore, in a case of recommending an application introduced by a stationary terminal 2 for a number of unspecified users to use, the motivation for use by the user is easily maintained.

In a case where it is determined that the user has the right to use the terminal 2 (step S110, "YES"), the control unit 11 ends the processing without issuing the coupon.

Through the operation above, at the timing when the user performs an operation on the terminal 2, the information processing apparatus 1 of the information processing system 9 recommends, to the user, an application according to the operation and guides the user to the terminal through which the application is capable of being used, so that the user of the terminal 2 knows the application that provides a necessary function now, and the terminal through which it is possible to experience the application.

MODIFIED EXAMPLE

Although the exemplary embodiment has been described, the contents of the exemplary embodiment may be modified as follows. The following modified examples may be combined with each other.

Modified Example 1

In the exemplary embodiment described above, referring to the application DB 122, the information processing apparatus 1 calculates the improvement amount indicating the degree to which the operation of the user is improved with use of the specified application, but this calculation may not be performed.

Modified Example 2

In the exemplary embodiment described above, the second specifying unit 112 specifies the terminal 2 through which the application specified by the first specifying unit 111 is capable of being used, but in a case where a plurality of the terminals 2 are provided, the second specifying unit 112 may evaluate convenience of each of the plurality of the terminals 2, and may specify one or more terminals 2 based on the convenience thereof. The "convenience of the terminal 2" is evaluated, for example, by any one of characteristics such as a distance from the user, congestion degree, and cost, or a combination thereof.

For example, the information processing apparatus 1 acquires the position information indicating a position of the user from the terminal 2 used by the user, and calculates a distance between the terminal 2 specified by the second specifying unit 112 and the user, based on a position of the terminal 2 specified by the second specifying unit 112 and the position of the user indicated by the acquired position information. Then, the calculated distance may be compared with the threshold value, and the convenience of each terminal 2 may be evaluated.

Each terminal 2 has a human sensor or the like using an element for detecting infrared rays and the like and may be configured to be able to recognize the number of people who are lined up in a queue in order to use the terminal itself. In this case, the information processing apparatus 1 may acquire information indicating the number of people waiting for use from a plurality of terminals 2, calculate the degree of congestion of those terminals 2, and evaluate the convenience.

Modified Example 3

In a case where the second specifying unit 112 evaluates the convenience of each of the plurality of terminals 2 and specifies one or more terminals 2 based on the convenience thereof, the second specifying unit 112 may evaluate the convenience of the terminal 2 for each user.

The characteristics that the user feels convenience are often different for each user. For example, since a certain user puts emphasis on time, the user would like to avoid a congested terminal 2, but since another user puts emphasis on cost, the user would like to use a terminal 2 which is set to a low price, even though the user waits for a while.

The information processing apparatus 1 may stores data of the characteristics on which each user puts emphasis, previously in the storage unit 12 by using a weighting coefficient or the like, and may evaluate the convenience for the user of the terminal 2 specified by the second specifying unit 112, based on the results obtained by multiplying this weighting coefficient peculiar to each user by an amount specified for various characteristics.

Modified Example 4

In the exemplary embodiment described above, the transmitting unit 113 has transmitted the application information indicating the application specified by the second specifying unit 112 and the terminal information indicating the terminal 2 specified by the first specifying unit 111, to the terminal 2 operated by the user, but may transmit information indicating the presence or absence of a right for the user to use the application specified by the second specifying unit 112 on the terminal 2 specified by the first specifying unit 111. In this case, the right list 1252 stores, for each pair of the terminal type name or the terminal name and the application, whether or not the user may use the application on the terminal corresponding to the terminal type name or the terminal name. Referring to the right DB 125, the transmitting unit 113 may transmit the presence or absence of the right for the user to use the application described above on the terminal 2 described above.

Modified Example 5

In the exemplary embodiment described above, in a case where it is determined that the user does not have the right to use the specified terminal 2, the information processing apparatus 1 has issued a coupon for permitting use of the terminal 2 under the predetermined conditions, but may not issue this coupon. In this case, for example, the information processing apparatus 1 may transmit, to the user, that the use of this terminal 2 becomes possible in a case where the user satisfies the predetermined conditions in an additional payment, and the like.

Modified Example 6

In the exemplary embodiment described above, in the case where it is determined that a history in which the information of the specified application has been transmitted in the past is provided, the control unit 11 of the information processing apparatus 1 does not have transmitted the information of this application to the terminal 2, but may transmit the information.

The control unit 11 may be configured to compare the number of times of histories transmitted in the past with a threshold value, and not to transmit the information in a case where the number of times exceeds the threshold value.

In a case where, in association with transmission of the application, the history DB 124 stores presence or absence of a response from the user and contents of the response with respect to the transmission, the control unit 11 may transmit, to the terminal, the information of the application according to the contents of the response, or may change a mode of the transmission according to the contents of the response, in the case where it is determined that a history in which the information of the specified application has been transmitted in the past is provided.

Modified Example 7

In the exemplary embodiment described above, the information processing system 9 has the information processing apparatus 1, but may provide functions of the information processing apparatus 1 in a cloud configured by a plurality of information processing apparatuses.

Figure 13:
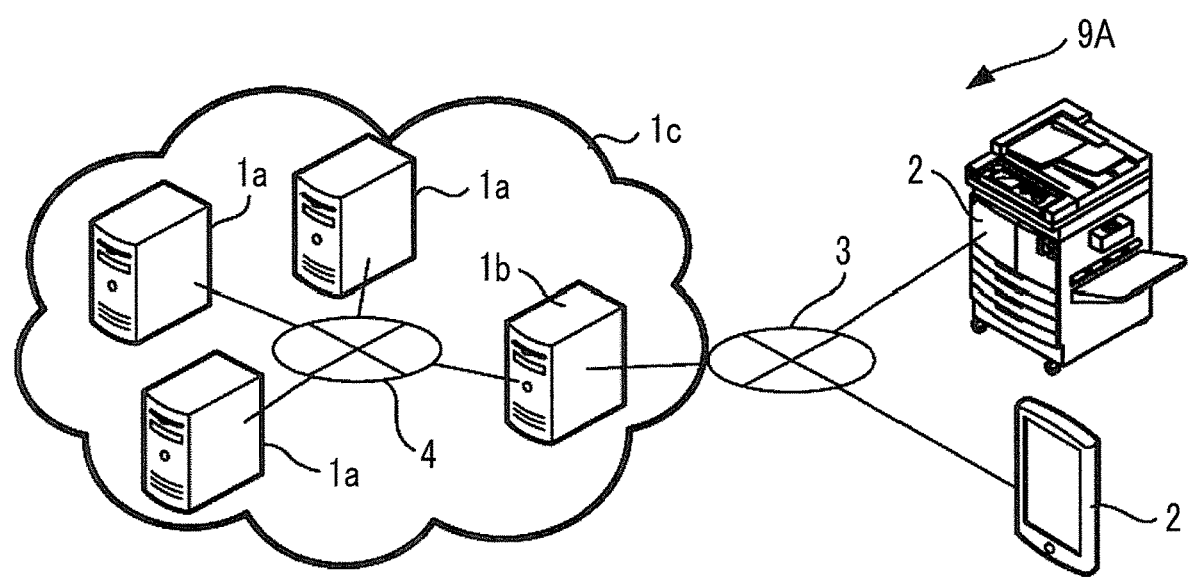
FIG. 13 is a diagram showing a configuration of an information processing system 9A in a modified example.

FIG. 13 is a diagram showing the configuration of the information processing system 9A in this modified example. In the information processing system 9A shown in FIG. 13, there is provided a cloud 10 instead of one information processing apparatus 1. The cloud 10 includes a plurality of information processing apparatuses 1A, at least one gateway apparatus 1B, and a communication channel 4 connecting these apparatuses.

The communication channel 4 is a communication channel usable in public such as the Internet. The gateway apparatus 1B is an apparatus that constructs a virtual dedicated line called, for example, a Virtual Private Network (VPN) or the like through the communication channel 4 and mediates provision of the functions of the information processing apparatus 1A to the communication channel 3 which is a LAN. In this case, the cloud 1C provides a function corresponding to the information processing apparatus 1 in the information processing system 9 described above, even though one of the plurality of information processing apparatuses 1A does not function due to troubles, maintenance, or the like.

Modified Example 8

A program executed by the control unit 11 of the information processing apparatus 1 may be provided in a state that the computer apparatus stores the program on a readable recording medium such as a magnetic recording medium such as a magnetic tape and a magnetic disk, an optical recording medium such as an optical disk, a magneto-optical recording medium, a semiconductor memory, or the like. This program may be downloaded through a communication channel such as the Internet. As control means exemplified by a control unit 11 described above, various apparatuses other than the CPU may be applied, for example, a dedicated processor or the like is used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, configured to
acquire operation information indicating an operation of a user;
specify an application corresponding to the operation information among applications not used by the user;
specify a terminal through which the application specified is capable of being used; and
transmit application information indicating the application and terminal information indicating the terminal, to a terminal operated by the user.

2. The information processing apparatus according to claim 1,
wherein the processor is configured to specify an application of which operation indicated by the operation information is improved by use.

3. The information processing apparatus according to claim 2,
wherein the processor is configured to calculate an improvement amount indicating a degree to which the operation indicated by the operation information is improved by using the application for each application, and specify one or more of applications based on the improvement amount, and
transmit the improvement amount calculated for the application indicated by the application information.

4. The information processing apparatus according to claim 2,
wherein, in a case where a plurality of terminals through which the application is capable of being used are provided, the processor is configured to evaluate convenience of each of the plurality of terminals and specify one or more of terminals based on the convenience.

5. The information processing apparatus according to claim 2,
wherein the processor is configured to transmit information indicating whether or not the user has a right to use the application on the terminal.

6. The information processing apparatus according to claim 3,
wherein, in a case where a plurality of terminals through which the application is capable of being used are provided, the processor is configured to evaluate convenience of each of the plurality of terminals and specify one or more of terminals based on the convenience.

7. The information processing apparatus according to claim 3,
wherein the processor is configured to transmit information indicating whether or not the user has a right to use the application on the terminal.

8. The information processing apparatus according to claim 4,
wherein the processor is configured to evaluate the convenience for each user.

9. The information processing apparatus according to claim 4,
wherein the processor is configured to transmit information indicating whether or not the user has a right to use the application on the terminal.

10. The information processing apparatus according to claim 6,
wherein the processor is configured to evaluate the convenience for each user.

11. The information processing apparatus according to claim 6,
wherein the processor is configured to transmit information indicating whether or not the user has a right to use the application on the terminal.

12. The information processing apparatus according to claim 1,
wherein, in a case where a plurality of terminals through which the application is capable of being used are provided, the processor is configured to evaluate convenience of each of the plurality of terminals and specify one or more of terminals based on the convenience.

13. The information processing apparatus according to claim 12,
wherein the processor is configured to evaluate the convenience for each user.

14. The information processing apparatus according to claim 12,
wherein the processor is configured to transmit information indicating whether or not the user has a right to use the application on the terminal.

15. The information processing apparatus according to claim 13,
wherein the processor is configured to transmit information indicating whether or not the user has a right to use the application on the terminal.

16. The information processing apparatus according to claim 1,
wherein the processor is configured to transmit information indicating whether or not the user has a right to use the application on the terminal.

17. The information processing apparatus according to claim 16,
wherein, in a case where no right is provided, the processor is configured to transmit data for granting the right to the user under a predetermined condition.

18. The information processing apparatus according to claim 1,
wherein the processor is configured not to transmit application information that has already transmitted.

19. An information processing system comprising:
the information processing apparatus according to claim 1; and
a terminal that
accepts an operation of the user to supply operation information indicating the operation to the information processing apparatus,
receives, from the information processing apparatus, application information and terminal information, and
presents the application information and the terminal information to the user.

20. A non-transitory computer readable medium storing a program that causing a computer to function as:
acquiring operation information indicating an operation of a user;
specifying an application corresponding to the operation information among applications not used by the user;
specifying a terminal through which the application specified is capable of being used; and
transmitting application information indicating the application and terminal information indicating the terminal, to a terminal operated by the user.

* * * * *